J. C. SHARP.
LUBRICATED JOURNAL BOX AND PULLEY BEARING.
APPLICATION FILED AUG. 19, 1920.
1,386,961.
Patented Aug. 9, 1921.
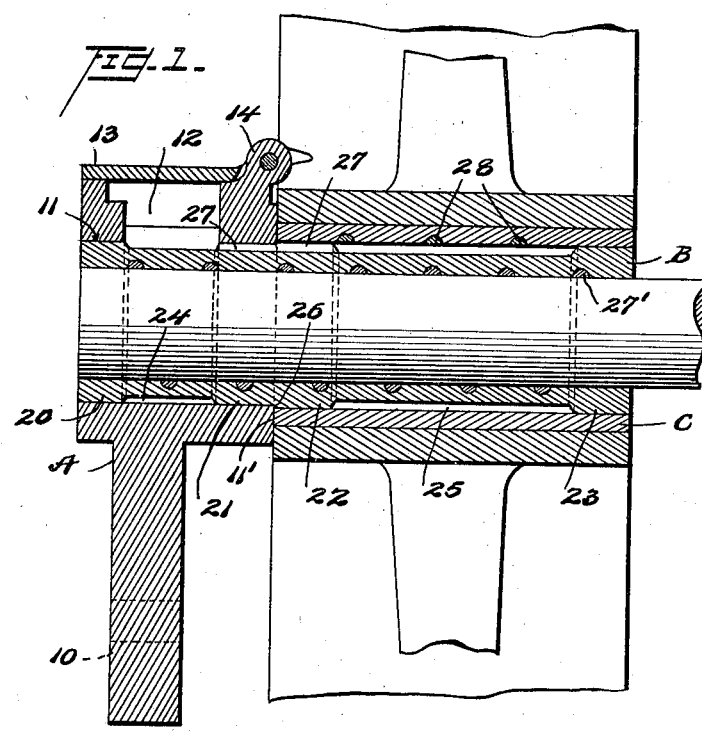
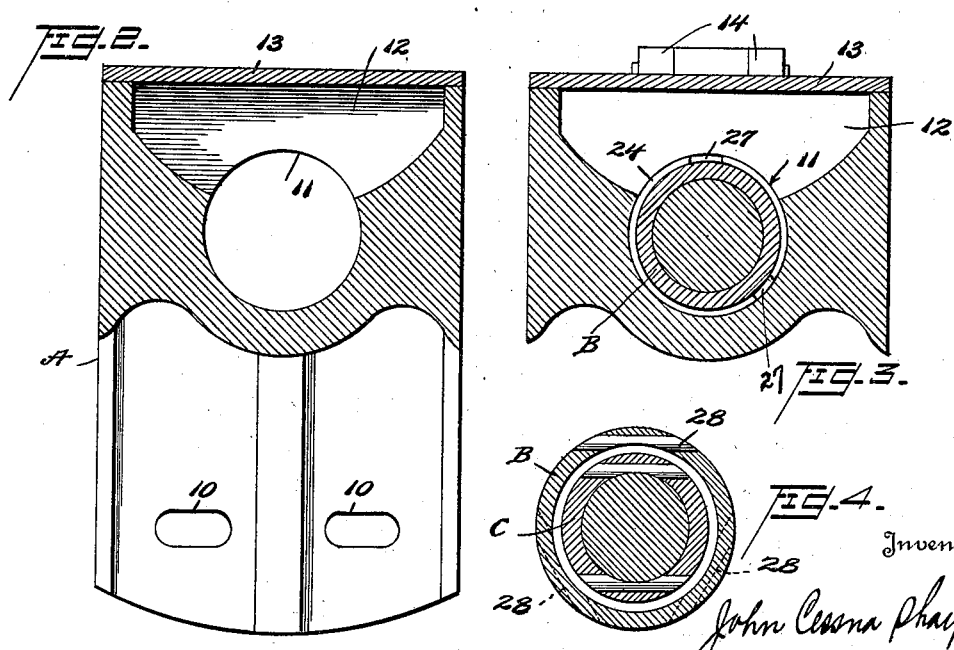

UNITED STATES PATENT OFFICE.

JOHN CESSNA SHARP, OF CHATTANOOGA, TENNESSEE, ASSIGNOR TO MOCCASIN BUSHING COMPANY, OF CHATTANOOGA, TENNESSEE, A COPARTNERSHIP CONSISTING OF JOHN CESSNA SHARP, JOHN S. POINDEXTER, AND WILLIAM F. WARD.

LUBRICATED JOURNAL-BOX AND PULLEY BEARING.

1,386,961.   Specification of Letters Patent.   Patented Aug. 9, 1921.

Application filed August 19, 1920. Serial No. 404,662.

*To all whom it may concern:*

Be it known that I, JOHN CESSNA SHARP, a citizen of the United States, residing at Chattanooga, in the county of Hamilton and State of Tennessee, have invented certain new and useful Improvements in Lubricated Journal-Box and Pulley Bearings, of which the following is a specification.

This invention relates to a lubricated journal box and pulley bearing, and more particularly to such a device in which the pulley is mounted upon a bushing, which in turn is mounted upon the journal of a shaft.

Reference is had to my companion application executed on even date herewith, S. N. 404,663, filed August 19, 1920, in which is shown and claimed a lubricated bearing comprising a plurality of stout, hollow, cylindrical members, one mounted upon the other, and having their adjacent surfaces spaced apart between their ends to form an intermediate oil chamber and with their ends in oil tight relationship.

The invention consists generally of a supporting casting, in which is formed a recess or receptacle for liquid lubricant, and a pair of bushing members so correlated as to provide an oil chamber between them in communication with the oil recess of the casting. From the oil chamber, lubricant is fed to the bearing surface of one or both of the bushing members.

It has for its object the production of a compact structure which will efficiently support a shaft and a loose pulley and at the same time properly lubricate one or both of said elements. A further object of the invention is to provide in a support of this character a single chamber from which lubricant may be fed to both the journal of the shaft and the pulley bearing. A further object is to provide a supporting structure containing a lubricant chamber which may be filled from a single oil reservoir and from which it is possible to feed lubricant efficiently and economically to a plurality of bearing surfaces. Another object is the provision of a combined support and bearing, wherein the parts when assembled are practically permanently attached to each other and will not be displaced by any conditions of usage, storage or transportation.

Other objects and advantages of the invention will hereinafter appear in the following description and the novel features thereof will be particularly pointed out in the appended claims.

In the drawings, in which like letters of reference indicate like parts throughout the several figures, Figure 1 is a longitudinal section through the support and bearing members, Fig. 2 is a transverse section through the supporting casting with bushing member removed, Fig. 3 is a similar view through the casting with the bushing in place, and Fig. 4 is a transverse section through the two bushings showing the annular oil chamber therebetween and the location of the feeding means for the lubricant to the bearing surfaces.

While I have shown in the drawings a particular embodiment of my invention, it will be understood that it is for the purposes of illustration only, and that various modifications of the same may be resorted to without departing from the spirit of the invention as defined by the appended claims.

The improved bearing and support, as shown in the drawings, consists of three parts, the casting A, the shaft bushing B and the pulley bushing C.

The casting A has been illustrated as an end support for a shaft and is designed to be attached to any suitable supporting structural member in a shop by means of bolts passing through the openings 10. It is provided with a central bore 11, which is herein shown as extending from one face to the other of said casting, said bore being machined as is also the face 11' of the casting for a purpose hereinafter to appear. There is formed a recess or chamber 12 in the casting for the reception of oil, which recess opens into the central bore, and is provided with the usual lid 13 hinged to the ear 14 provided upon the casting.

Provision is made for the formation of an adequate oil chamber, and to this end I have shown the shaft bushing B as provided with four ribs 20, 21, 22 and 23, but it will be understood that this oil chamber may be otherwise formed. The ribs 20 and 21 are of the same height and provide an annular chamber between them, while the ribs 22 and 23 are of slightly greater height, forming the annular chamber 25. The ribs 21 and 22 are adjacent, and form the shoulder 26, and in these ribs there are cut two oil channels 27, 27, for a purpose which will hereinafter appear.

The pulley bushing is a cylinder, with a suitable number of transverse bores, which are disposed therein substantially tangentially to the inside diameter of the cylinder, which bores are filled with an insert or feeder 28, made of any suitable material, wood cut longitudinally of the grain being preferred. This pulley bearing is the same as that described and claimed in my Patent No. 1,113,143 dated October 6, 1914.

The member B is also provided with bores of this type throughout its length, which are provided with similar inserts or feeders.

The ribs 20 and 21 of the shaft bushing are of the same diameter as the central bore of the casting, and together with the chamber between them are of a width equal to the distance between the two vertical faces of the casting, while the diameter of the ribs 22 and 23 is the same as the inside diameter of the member C; the length of the member C is equal to the width of the ribs 22 and 23 and the intermediate chamber.

The parts are assembled by pressing or driving the end of the bushing B having ribs 20 and 21 into the central bore of the casting, which will cause the shoulder 26 to snugly abut the face 11' of the casting to form an oil tight joint. Oil tight joints will likewise be formed between the ribs 20 and 21 and those portions of the casting with which they coact. The member C is then forced or pressed upon the projecting end of the member B, until the edge of the cylinder C also abuts the face 11' of the casting to form an oil tight joint therewith. Oil tight joints are also formed between the inner surface of the member C and the ribs 22 and 23. The assembling of the parts in this manner provides a rigid construction, in which the elements are practically permanently attached to each other and not liable to be separated or loosened by any conditions of use, transportation or storage.

The communicating passages 27, 27, may be located at any point, either at the top or bottom of the member B when assembled, but I have shown one of them located at the top and the other near the bottom, which secures facility in filling the chambers with lubricant.

With the parts thus assembled and the casting properly supported, oil is introduced into the receptacle 12 from whence it will flow to the annular chamber 24 and through the communicating passages 27, into the annular chamber 25, filling both chambers and filtering through the inserts 28 to the bearing surfaces of the bushings in an even and efficient manner. It will be noted that the several oil tight joints hereinbefore referred to provide an efficient means for confining the oil so that no leakage thereof will occur. It will also be noted that the bearing member B is provided with an insert 27' which is beyond the chamber 25 and does not communicate therewith. This insert will absorb any excess oil which may find its way along the bearing surface toward the end of the journal box; it will tend to distribute this oil around the bearing surface.

It is obvious that by my invention an efficiently and economically lubricated shaft and pulley bearing is formed, one in which there will be no wastage of lubricant and in which the lubricant will be filtered before being fed to the bearing surfaces. The height of oil in the chamber 12 and the absence of rotating bushing elements will insure an even and adequate supply of lubricant to both bearing surfaces, while the provision of a single source of lubricant in the chamber 12 for both bearings results in a saving of labor in refilling, in addition to the saving in expense due to the economical use of lubricant.

While I have shown and described my invention as applying to a combined support and bearing for a rotating shaft and rotating pulley, it will be understood that it is capable of use as a support and bearing for a rotatable pulley upon a non-rotating shaft or as a bearing for a rotating shaft alone unassociated with a rotating pulley, in which cases the transverse bores and inserts of one or the other of the bushings are omitted.

Having described my invention, what I claim as new and desire to secure by Letters Patent is:

1. In a lubricated bearing, a supporting casting, a pair of hollow bushing members mounted one upon the other and supported in said casting, the said bushing members providing inner and outer bearing surfaces, and means in said casting and bushings for supplying oil to said bearing surfaces.

2. In a lubricated bearing, a supporting casting, a hollow sleeve permanently mounted in said casting, a second hollow sleeve permanently mounted upon said first sleeve, the adjacent surfaces of said sleeves being spaced apart for a portion of their length intermediate their ends to form an oil chamber therebetween, means for supplying oil to said chamber, and means for feeding said oil to the bearing surface of one of said sleeves.

3. In a lubricated bearing, a supporting casting, a shaft bushing permanently mounted in said casting, a pulley bushing permanently mounted upon said shaft bushing, the adjacent surfaces of said bushing members being spaced apart for a portion of their length intermediate their ends to form an oil chamber therebetween, means for supplying oil to said chamber, and means for feeding said oil to the bearing surfaces of both of said bushings.

4. In a lubricated bearing, a casting having a bore and an oil recess thereabove, a bushing mounted in said bore and provided with a conduit communicating with said oil recess, said bushing having a portion extended beyond said casting and provided with ribs, and a second bushing mounted upon said ribs, both said bushings being provided with filtering inserts for feeding the lubricant to the bearing surfaces of said bushings.

5. In a lubricated bearing, a supporting casting having a bore and an oil recess communicating therewith, a shaft bushing mounted in said bore and projecting beyond the face of said casting and provided with ribs upon its projecting end, a pulley bushing mounted upon said shaft bushing and forming with said ribs an oil chamber, a communicating passage between said oil recess and oil chamber, and means in said bushings for feeding oil to the shaft and pulley bearing surfaces.

6. In a lubricated bearing, a supporting casting having an oil recess therein, a bushing mounted in said casting and projecting therefrom, a second bushing mounted upon the projecting portion of said first mentioned bushing, an oil chamber formed between said bushings, a communicating passageway between said oil recess and chamber, and means for feeding oil from said chamber to the inner surface of said first mentioned bushing and the outer surface of said second bushing.

7. In a lubricated bearing, a bushing, a pulley bushing mounted thereon, the adjacent surfaces of said bushings being spaced apart between their ends to provide an interior oil chamber, means for supporting said bushings, means for supplying lubricant to said interior oil chamber, and means for feeding said lubricant through said bushings to the bearing surfaces thereof.

8. In a lubricated bearing, a plurality of hollow bushings mounted one upon the other, one of which is provided with spaced ribs defining an oil chamber between said bushings, means for feeding oil to the outer surface of said outer bushing and to the inner surface of said inner bushing, and means for supplying oil to said oil chamber.

9. In a lubricated bearing, a supporting casting provided with an oil reservoir and a bore communicating therewith, a bushing provided with a plurality of ribs, a pair of of said ribs fitting within said casting bore and defining an oil chamber therein, a second bushing fitting upon others of said ribs and abutting the face of said casting to form an oil tight joint therewith and defining an oil chamber between said bushings, communicating passages in said ribs permitting the filling of said second oil chamber from the first oil chamber, and means in both of said bushings for feeding lubricant to the bearing surfaces thereon.

In testimony whereof I affix my signature.

JOHN CESSNA SHARP.